(12) United States Patent
Makovsky

(10) Patent No.: US 10,749,753 B2
(45) Date of Patent: *Aug. 18, 2020

(54) SYSTEM AND METHOD FOR GENERATING DISCOVERY PROFILES FOR DISCOVERING COMPONENTS OF COMPUTER NETWORKS

(71) Applicant: ServiceNow, Inc., Santa Clara, CA (US)

(72) Inventor: Bnayahu Makovsky, Savyon (IL)

(73) Assignee: ServiceNow, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/293,477

(22) Filed: Mar. 5, 2019

(65) Prior Publication Data

US 2019/0268236 A1  Aug. 29, 2019

Related U.S. Application Data

(63) Continuation of application No. 15/333,309, filed on Oct. 25, 2016, now Pat. No. 10,263,849.

(51) Int. Cl.
  *H04L 12/24*    (2006.01)
  *H04L 29/08*    (2006.01)

(52) U.S. Cl.
  CPC ............ *H04L 41/12* (2013.01); *H04L 41/046* (2013.01); *H04L 67/30* (2013.01); *H04L 67/34* (2013.01); *H04L 67/18* (2013.01)

(58) Field of Classification Search
  CPC ....... H04L 41/12; H04L 41/046; H04L 67/34; H04L 67/30; H04L 67/18
  See application file for complete search history.

(56) References Cited

U.S. PATENT DOCUMENTS 6,442,144 B1   8/2002   Hansen et al.
6,516,345 B1   2/2003   Kracht
(Continued)

OTHER PUBLICATIONS

Solarwinds, "Engineer's Toolset", Version 11.0.3, Administrator Guide, Aug. 19, 2016, https://support.solarwinds.com/@api/deki/liles/5697/ToolsetAdministratorGuide.pdf, pp. 89-94, 102, 193 and 228-229.

(Continued)

*Primary Examiner* — Jimmy H Tran
(74) *Attorney, Agent, or Firm* — Fletcher Yoder PC

(57) ABSTRACT

Generating discovery profiles for discovering components of a computer network using agent software can include receiving a command from a client device to generate a discovery profile for an agent software instance. A network subnet and at least one network gateway address can be obtained from the agent software instance, which network subnet and at least one network gateway address can be associated with a network interface of the computing device operating the agent software. At least one other network subnet can be obtained from the agent software instance by sending instructions to the agent software instance to identify the at least one other network subnet using the at least one network gateway address. A discovery profile including the network subnet and the at least one other network subnet can then be generated for the agent software instance.

20 Claims, 9 Drawing Sheets

(56) References Cited

U.S. PATENT DOCUMENTS

| | | | |
|---|---|---|---|
| 6,795,403 B1* | 9/2004 | Gundavelli | H04L 41/12 370/256 |
| 6,883,024 B2* | 4/2005 | Ullmann | H04L 29/06 709/201 |
| 6,978,314 B2 | 12/2005 | Tarr | |
| 7,418,486 B2 | 8/2008 | Brubacher et al. | |
| 7,450,525 B2 | 11/2008 | Son et al. | |
| 7,617,077 B2 | 11/2009 | Putnam | |
| 7,634,149 B2 | 12/2009 | Putnam | |
| 7,821,968 B2 | 10/2010 | Keeni et al. | |
| 8,040,869 B2 | 10/2011 | Gaspard et al. | |
| 8,125,927 B2 | 2/2012 | Nandy et al. | |
| 8,510,548 B1 | 8/2013 | Markov | |
| 8,738,745 B1* | 5/2014 | Brandwine | H04L 41/12 709/220 |
| 8,868,736 B2 | 10/2014 | Bowler | |
| 9,003,460 B2 | 4/2015 | Basile | |
| 9,438,479 B1 | 9/2016 | Friedman | |
| 9,654,340 B2* | 5/2017 | Gabrielson | H04L 41/0806 |
| 9,736,016 B2* | 8/2017 | Brandwine | H04L 69/40 |
| 10,142,353 B2* | 11/2018 | Yadav | H04L 43/04 |
| 10,361,911 B2* | 7/2019 | Brandwine | H04L 12/4641 |
| 2003/0009540 A1* | 1/2003 | Benfield | H04L 41/0213 709/220 |
| 2003/0041167 A1* | 2/2003 | French | H04L 29/06 709/238 |
| 2003/0041238 A1 | 2/2003 | French | |
| 2003/0163583 A1* | 8/2003 | Tarr | H04L 29/06 709/245 |
| 2003/0216143 A1 | 11/2003 | Roese | |
| 2003/0233427 A1 | 12/2003 | Taguchi | |
| 2004/0233857 A1 | 11/2004 | Wimmer | |
| 2004/0249907 A1 | 12/2004 | Brubacher | |
| 2005/0110800 A1 | 5/2005 | Putnam | |
| 2005/0114107 A1 | 5/2005 | Putnam | |
| 2005/0163060 A1* | 7/2005 | Riley | H04L 47/781 370/254 |
| 2005/0243739 A1* | 11/2005 | Anderson | H04L 29/12009 370/254 |
| 2005/0270986 A1 | 12/2005 | Watanabe et al. | |
| 2006/0109797 A1 | 5/2006 | Ishida | |
| 2006/0256733 A1 | 11/2006 | Bejerano | |
| 2007/0033279 A1 | 2/2007 | Battat | |
| 2007/0208840 A1 | 9/2007 | McConville | |
| 2007/0217414 A1 | 9/2007 | Berkman | |
| 2008/0008179 A1 | 1/2008 | Chen | |
| 2008/0019499 A1* | 1/2008 | Benfield | H04L 41/0233 379/221.15 |
| 2009/0216853 A1* | 8/2009 | Burrow | H04L 41/12 709/208 |
| 2010/0138532 A1 | 6/2010 | Glaeser | |
| 2010/0153540 A1 | 6/2010 | Li | |
| 2010/0229030 A1 | 9/2010 | Shouno | |
| 2010/0296411 A1 | 11/2010 | Chambers | |
| 2010/0306409 A1 | 12/2010 | Jansen | |
| 2011/0075590 A1 | 3/2011 | Kormann | |
| 2013/0282901 A1 | 10/2013 | Mouravyov | |
| 2013/0282902 A1 | 10/2013 | Eichberger | |
| 2013/0321458 A1* | 12/2013 | Miserendino | H04L 41/0883 345/629 |
| 2014/0337500 A1* | 11/2014 | Lee | H04L 67/2866 709/223 |
| 2015/0244819 A1 | 8/2015 | Duleba | |
| 2015/0249569 A1* | 9/2015 | Brandwine | H04L 41/5051 709/220 |
| 2015/0254969 A1 | 9/2015 | Bishop | |
| 2016/0212228 A1 | 7/2016 | Arkin | |
| 2019/0342212 A1* | 11/2019 | Sivasubramanian | H04L 41/08 |

OTHER PUBLICATIONS

Solarwinds, "Network Topology Mapper Administrator Guide", SolarWinds Network Topology Mapper 18.01.16, Version 2.2.2, downloaded Oct. 18, 2016, http://www.solarwinds.com/documentation/NTM/docs/NTMAdminGuide.pdf, 70 pp.

Sciencelogic, "See How Your Clouds Are Performing", Private—Public—Multi-Cloud, Cloud Monitoring For All Your Clouds, Date Unknown, downloaded Oct. 18, 2016, https://www.sciencelogic.com/product/technologies/cloud, 7 pp.

Ipswitch, "Whatsup Gold Network Monitoring", Date Unknown, downloaded Oct. 18, 2016, https://NWW.ipswitch.com/application-and-network-monitoring/whatsup-gold, 9 pp.

Solana Networks, "Smarthawk", Network Mapping Topology, Route Analytics, Date Unknown, downloaded Oct. 18, 2016, http://www.solananetworks.com/products/smarthawk, 3 pp_.

Solarwinds, "Network Discovery and Inventory Tool", with Network Performance Monitor, Network Discovery Tool—Network Inventory, SolarWinds, Date Unknown, downloaded Oct. 18, 2016, http://www.solarwinds.com/topics/network-discovery-tool, 3 pp.

Solarwinds, "Discover Network Devices", with Network Performance Monitor, Network Device Discovery Tool, SolarWinds, Date Unknown, downloaded Oct. 18, 2016, http://www.solarwinds.com/topics/network-device-Discovery, 3 pp.

Solarwinds, "Subnet Calculator and List Software", with Engineer's Toolset, Glassful & Classless Subnet Calculator—Subnet List—SolarWinds, Date Unknown, downloaded Oct. 18, 2016, http://www.solarwinds.com/topics/subnet-calculator, 3 pp.

Solarwinds, "Network Topology Mapper", Automatically Map Your Network in Minutes, Network Mapping—Network Topology Software, SolarWinds, Date Unknown, downloaded Oct. 18, 2016, http://www.solarwinds.com/network-topology-mapper, 4 pp.

* cited by examiner

DISCOVERED LOCATIONS

▼ ☐ UNITED STATES OF AMERICA
    ▼ ☐ CALIFORNIA
        ▼ ☐ SAN DIEGO
            ☐ 133.106.140.0
            ☐ 133.106.141.0
            ☐ 133.106.142.0
        ▼ ☐ SAN FRANCISCO
            ☐ 161.104.102.0
            ☐ 161.104.103.0
    ▶ ☐ NEW YORK
    ▶ ☐ WASHINGTON

FIG. 6

SYSTEM AND METHOD FOR GENERATING DISCOVERY PROFILES FOR DISCOVERING COMPONENTS OF COMPUTER NETWORKS

CROSS-REFERENCE TO RELATED APPLICATIONS

This application is a continuation of and claims priority to U.S. patent application Ser. No. 15/333,309, filed on Oct. 25, 2016, which is incorporated by reference herein in its entirety.

TECHNICAL FIELD

This disclosure relates in general to generating discovery profiles for discovering components of computer networks in an electronic computing and communications system.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Most individuals and organizations, such as businesses and governmental agencies, utilize computers on a daily basis to perform a variety of functions. These functions may include, for example, email, internet access, word processing, computer-aided design, media streaming, and many others. Indeed, individuals and organizations not only utilize their own computers to perform these functions, but since many of the functions are "cloud-based" most individuals and organizations utilize servers in data centers around the globe to perform many of these functions.

As organizations grow, the number of users and, thus, computers and associated devices, such as file servers, email servers, routers, etc., increase as well. Hence, many organizations utilize Information Technology Operations Management (ITOM) tools to manage such systems. The ITOM tools may include policies, processes, and procedures to design and maintain the computers and associated functionalities for an organization. For example, ITOM tools may keep track of user computers and associated software, servers, routers, etc., within an organization so that administrators can determine when users have been added or removed, when equipment has been added, removed, or needs to be upgraded, when software needs to be updated, etc.

When dealing with individuals or small organizations, such tasks can be relatively straight forward and easy to perform. However, as organizations and their associated information technology (IT) infrastructure grows, designing and maintaining such systems can be a difficult task. To facilitate the management of IT systems in such organizations, discovery services are available to provide administrators a process by which devices, software, and associated functionalities may be discovered and mapped. Some of these discovery services may be cloud-based where an ITOM service provider maintains one or more datacenters that can facilitate discovery services within an organization's network or networks to perform such discovery services, while other discovery services may be performed "on-premises" by IT administrators utilizing discovery software residing within the organization's computer network.

The resulting map of devices, software, and associated functionalities produced by the discovery service may be utilized by IT administrators to design and maintain an organization's computer network. For example, using a map produced by a discovery service, an IT administrator can monitor the status of the hardware or software connected to provide a software service of the computer network. Such discovery services may require that an IT administrator configure how the discovery service will operate, for example, by manually creating a discovery profile used to identify aspects of IT systems to be discovered.

BRIEF DESCRIPTION OF THE DRAWINGS

The description herein makes reference to the accompanying drawings, wherein like reference numerals refer to like parts throughout the several views.

FIG. 6 is an illustration of an example of a hierarchy of discovered components of a computer network according to geographical locations of the components.

DETAILED DESCRIPTION

Figure 1:
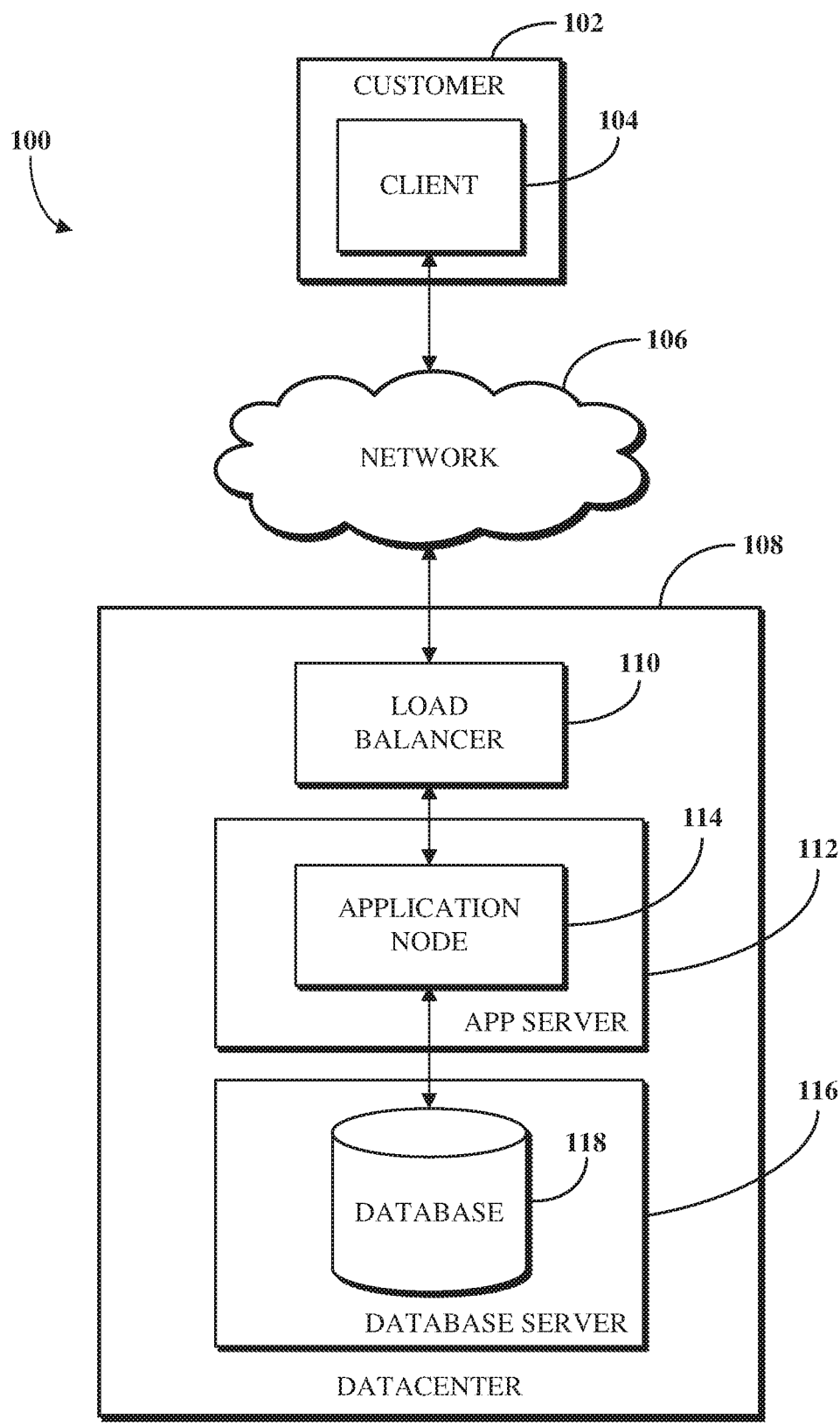
FIG. 1 is a block diagram of an example of an electronic computing and communications system.

Computer network discovery techniques can be used to maintain accurate information about the various components associated with the computer network. Generally, a discovery operation includes detecting a component of the computer network; identifying information about the component, such as status or configuration data; and updating a record for the component, such as a configuration item (CI) representing the component in a configuration management database (CMDB). These records can include or be used to define relationships between components of the computer network, for example, for delivering services to clients connecting to the computer network.

Software for managing the computer network (e.g., Information Technology Service Management (ITSM) tools, ITOM tools, or the like) can be provided as a software as service (SaaS) or platform as a service (PaaS) in a provider environment of an electronic computing and communications system, as on-premises software (e.g., within a customer environment, described below), or a combination thereof. The provider environment can include software and hardware controlled by a provider for providing instances of the software for managing the computer network. In some cases, the computer network can be part of a customer environment of an electronic computing and communications system. The customer environment can include software and hardware controlled by a customer. For example, a customer may be a public entity, private entity, or other corporate entity or individual that purchases or otherwise uses services of a software provider, such as an SaaS provider or a PaaS provider. The customer environment can be bounded by firewalls, routers, or other gateway devices that separate customer controlled networks and devices from external networks and devices, such as connections to the Internet or third parties. For example, the customer may engage with various vendors for providing cloud-based services over which the customer has administrative access, such as cloud storage providers or cloud computing providers. These cloud-based services provided to the customer may be considered to be part of the customer environment.

In some cases, software and hardware in the customer environment may not be directly accessible from the provider environment. Agent software operating within the customer environment can permit communication between the provider and customer environments (e.g., by initiating a connection from within the customer environment to a provider environment, such as by using an HTTP protocol permitted by a firewall of the customer environment), such that the agent software can be used for operations directed by the management software within the customer environment, such as for performing discovery operations for those components.

An administrator of a computer network of the customer environment can generate a discovery profile for the computer network by performing a full network scan (e.g., using the Address Resolution Protocol (ARP)) to discover the active components of the computer network. Information about discovered components can be stored within the discovery profile for performing future discovery operations. However, a full network scan can be a time-intensive process that require substantial user involvement. For example, a full network scan can include deploying agent software to computing devices operating throughout the computer network, testing connectivity of the agent software to a server device executing the software instantiating the customer environment including the computer network, entering and verifying credentials (e.g., Simple Network Management Protocol (SNMP) credentials) for known components of the computer network, defining schedules for performing later discovery operations on discovered components, identifying networks and subnets to be discovered, and more.

Further, once a set of components have been discovered, the administrator might wish to associate the discovered components of the computer network with geographical locations to maintain information about where those components operate. However, because typical systems for processing discovered information do not include a mechanism for efficiently associating geographical location information with discovered components of a computer network, an administrator might have to manually associate the geographical location information within respective records of the discovered components. This manual entry can be time-intensive or impractical in larger computer networks and environments.

In accordance with the present technologies described in detail below, discovery profiles can be generated for discovering components of a computer network with minimal user intervention. A command can be transmitted from a client device to cause the server device to generate the discovery profile using an agent software instance operating in the customer environment that can be selected by a user of the client device. A network subnet and at least one network gateway address accessible to the agent software instance can be identified by the agent software instance. At least one other network subnet can be obtained from the agent software instance identifying the at least one other network subnet using the at least one network gateway address. A discovery profile including the network subnet and the at least one other network subnet can be generated for the agent software instance. A schedule can be configured to periodically or otherwise perform a later discovery operation based on the discovery profile based on a selection of a same agent software instance selected to generate the discovery profile.

Also in accordance with the present technologies, a geographical map can be generated for initiating discovery of subnets within a computer network. A hierarchy of geo-location identifiers corresponding to levels indicating degrees of geographical abstraction can be received along with a listing of network subnets having associated geo-location identifiers included in the hierarchy. The geo-location identifiers can be mapped from the listing to corresponding first levels according to the hierarchy. A geographical map of the computer network at a first level can be generated by including indicators according to the geo-location identifiers from the listing at the first level and the corresponding levels. A graphical user interface including the geographical map and user interface elements can be generated such that commands associated with the indicators and specified geo-location identifiers can be received. A set of network subnets associated with the specified geo-location identifiers can be determined along with at least one agent software instance usable for performing discovery against the set of network subnets, for example, based on information included within a command. A discovery of the network subnets can then be initiated using the at least one agent software instance.

Implementations of this disclosure provide technological improvements particular to computer networks, for example, those concerning the discovery of network subnets, network gateway addresses, or other network components operating within a computer network. Computer network-specific technological problems, such as the efficient set-up and implementation of network discovery techniques within computer networks, can be wholly or partially solved by implementations of this disclosure. For example, discovery of network components is facilitated based on the generation of a discovery profile including a selection of agent software operating in a computer network. In another example, initiation of a discovery operation based on geographical abstraction of a computer network can permit a network administrator to more efficiently maintain and update information about computer networks in certain geographical regions. The implementations of this disclosure introduce new and efficient improvements in the ways in which components of a computer network can be discovered by generating discovery profiles for agent software instances associated with discoverable network components and associating location data with those discovery profiles to indicate geographical locations of those components.

To describe some implementations in greater detail, reference is first made to examples of hardware structures. FIG. 1 is a block diagram of an example of an electronic computing and communications system 100 in accordance with this disclosure. As used herein, the term "electronic computing and communications system," or variations thereof, can be, or include, a distributed computing system, such as a client-server computing system, a cloud computing system, a clustered computing system, or the like.

The system 100 can include one or more customers 102, which may be a private entity as described above. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit, or as a combination of physical units. In some implementations, a single physical unit can include multiple clients.

The client 104 can be an instance of an application running on a customer device associated with the customer 102. As used herein, the term "application" can include, but is not limited to, applications, programs, instances, processes, threads, services, plugins, patches, application version upgrades, or any other identifiable computing unit capable of accessing or interacting, directly or indirectly, with a database. The system 100 can include any number of customers or clients or can have a configuration of customers or clients different from that generally illustrated in FIG. 1. For example, and without limitation, the system 100 can include hundreds or thousands of customers, and at least some of the customers can include or be associated with any number of clients. A customer can include a customer network or domain. For example, and without limitation, the client 104 can be associated or communicate with a customer network or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers or can include a configuration of datacenters and servers different from that generally illustrated in FIG. 1. For example, and without limitation, the system 100 can include tens of datacenters, and at least some of the datacenters can include hundreds or any suitable number of servers. In some implementations, the datacenter 108 can be associated or communicate with one or more datacenter networks or domains, which can include domains other than the client domain.

The client 104 and the servers associated with the datacenter 108 may be configured to connect to, or communicate via, a network 106. Furthermore, a client 104 associated with the customer 102 can connect to the network 106 via a communal connection point, link, or path or using a distinct connection point, link, or path. A connection point, link, or path can be wired, wireless, use other communication technologies, or a combination thereof.

The network 106 can include, for example, the Internet, and/or the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, or a combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communication traffic, such as signals or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or application provided by the datacenter 108.

Maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

The datacenter 108 may include an application server 112 and a database server 116. The application server 112 or the database server 116 can be a computing system, which can include one or more computing devices, such as a desktop computer, a server computer, or any other computer capable of operating as a server. In some implementations, the application server 112 or the database server 116 can be non-hardware servers implemented on a physical device, such as a hardware server. In some implementations, the application server 112 and the database server 116 can be implemented as a single hardware server or as a single non-hardware server implemented on a single hardware server. Of course, any number of application servers or database servers can be implemented at the datacenter 108, and the datacenter 108 can include servers other than or in addition to the application server 112 or the database server 116, for example, a web server.

In some implementations, the application server 112 includes an application node 114, which can be a process executed on the application server 112. For example, and without limitation, the application node 114 can be executed in order to deliver services to a client, such as the client 104, as part of a web application. The application node 114 can be implemented using processing threads, virtual machine instantiations, or other computing features of the application server 112. In some implementations, the application node 114 can store, evaluate, or retrieve data from a database, such as the database 118 of the database server 116. The database 118 can also be referred to as a "database node" 118.

The application server 112 can include any suitable number of application nodes depending upon a system load or other characteristics associated with the application server 112. For example, and without limitation, the application server 112 can include two or more nodes forming a node cluster. The application nodes implemented on a single application server 112 may run on different hardware servers.

The database server 116 can be configured to store, manage, or otherwise provide data for delivering services to the client 104 over a network. The database server 116 may include a data storage unit, such as a database 118, which can be accessible by an application executed on the application node 114. The database 118 may be implemented as a relational database management system (RDBMS), an object database, an XML database, a CMDB, a management information base (MIB), one or more flat files, other suitable non-transient storage mechanisms, or a combination thereof. By way of non-limiting example, the system 100, in some implementations, can include an XML database and a CMDB. While limited examples are described, the database 118 can be configured as or comprise any suitable database type. Further, the system 100 can include one, two, three, or any suitable number of databases configured as or comprising any suitable database type or combination thereof.

Some or all of the systems and methods described herein can operate or be executed on or by the servers associated with the system 100. For example, an update for an application executed on the application node 114 can include updating or upgrading the database 118. In some implementations, the systems and methods described herein, portions thereof, or combinations thereof, can be implemented on a single device, such as a single server, or a combination of devices, for example, a combination of the client 104, the application server 112, and the database server 116. One or more databases (e.g., the database 118), tables, other suitable information sources, or portions or combinations thereof, may be stored, managed, or otherwise provided by one or more of the elements of the system 100 other than the database server 116, such as the client 104 or the application server 112.

In some implementations, the system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, or both, can be monitored, controlled, configured, or a combination thereof.

The network 106, one or more datacenters, such as the datacenter 108, and one or more load balancers, such as the load balancer 110, may be implemented within a distributed computing system. A load balancer associated with a distributed computing system (e.g., the load balancer 110) can communicate with the network 106, one or more datacenters (e.g., the datacenter 108), other load balancers, or a combination thereof. The load balancer 110 can be configured to route communications to a primary datacenter, identify a failover condition (e.g., such as an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as the database 118, and the secondary datacenter can include a secondary database. The secondary database can include an exact or substantially exact mirror, copy, or replication of the primary database. The primary database or the secondary database can be implemented as an RDBMS, an object database, an XML database, one or more flat files, or the like.

An application node implemented within a distributed computing environment can connect to or communicate with the primary database, which can be associated with the datacenter with which the application node is associated, or associated with another datacenter. For example, a primary datacenter can include a primary database and a first set of application nodes. A secondary datacenter can include a secondary database and a second set of application nodes. The application nodes of the first and second sets can provide a service or application to remote clients, and can read or write data in the primary database. The secondary database can mirror changes made to the primary database and prevent write operations from being performed directly on the secondary database. In the event that a failover condition associated with the primary database is identified, the secondary database can operate as the primary database and can allow read or write access to data. The primary database can then operate as the secondary database, mirror the new primary database, and prevent direct write access to the new secondary database.

A distributed computing system can allocate resources of a computer network using a multi-tenant or single-tenant architecture, for example. Allocating resources in a multi-tenant architecture can include installations or instantiations of one or more servers, such as application servers, database servers, or any other server, or combination of servers, that can be shared amongst multiple customers. For example, a web server, such as a unitary Apache installation; an application server, such as a unitary Java Virtual Machine; or a single database server catalog, such as a unitary MySQL catalog, can handle requests from multiple customers. In some implementations of a multi-tenant architecture, the application server, the database server, or both can distinguish between and segregate data or other information of the various customers using the system.

In a single-tenant infrastructure (which can also be referred to as a multi-instance architecture), separate web servers, application servers, database servers, or combinations thereof can be provisioned for at least some customers or customer sub-units. Customers or customer sub-units can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof can be installed on the same physical server. An installation can be allocated a portion of the physical server resources, such as RAM, storage, communications bandwidth, or processor cycles.

A customer instance can include multiple web server instances, multiple application server instances, multiple database server instances, or a combination thereof. The server instances can be physically located on different physical servers and can share resources of the different physical servers with other server instances associated with other customer instances. In a distributed computing system, multiple customer instances can be used concurrently. Other configurations or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, or a combination thereof.

Figure 2:
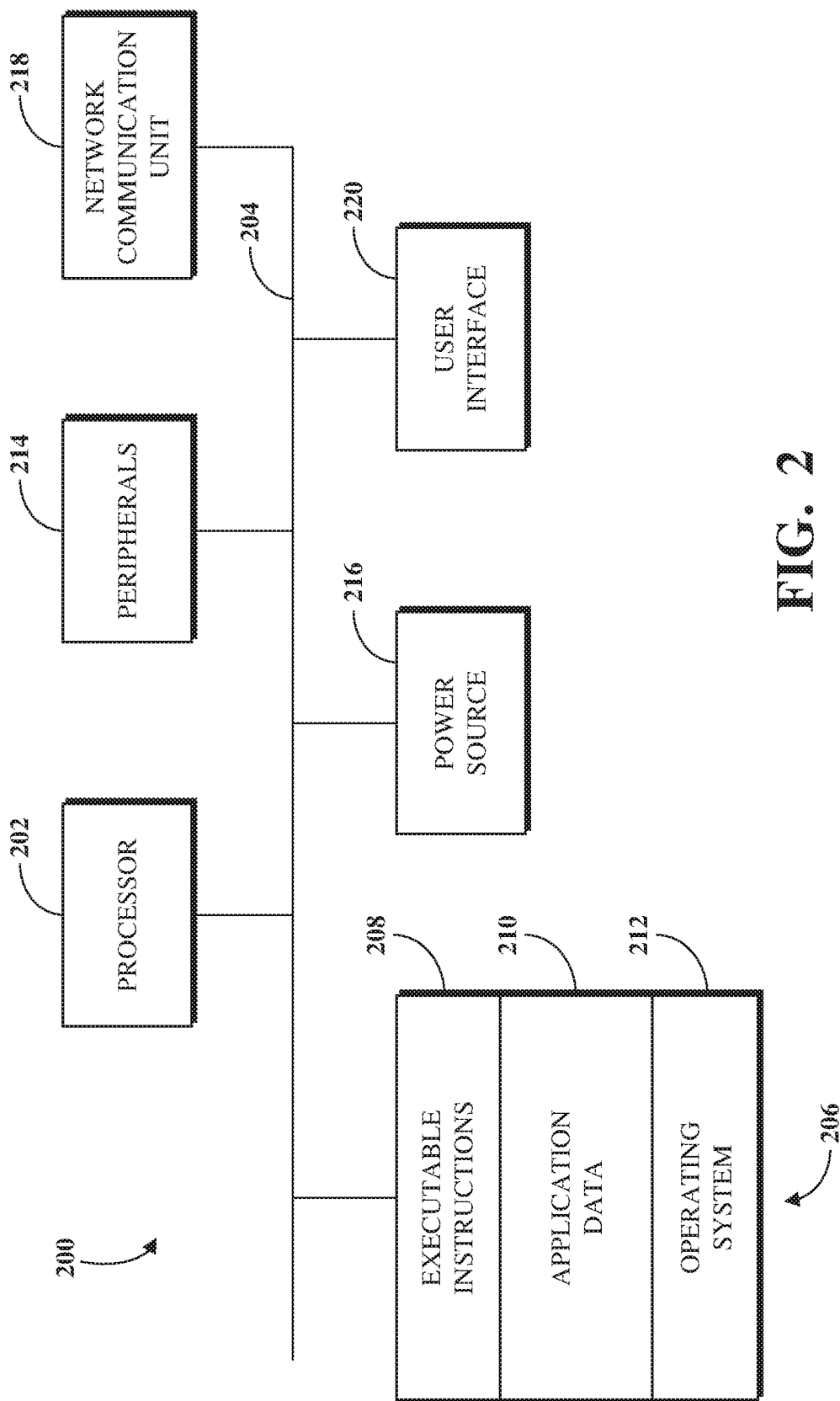
FIG. 2 is a block diagram of an example of an internal configuration of a computing device of an electronic computing and communications system.

FIG. 2 generally illustrates a block diagram of an example internal configuration of a computing device 200, such as a client 104 or a server, such as an application server 112 or a database server 116, of the system 100 as generally illustrated in FIG. 1. As previously described, a client or server can be a computing system including multiple computing devices or a single computing device, such as a mobile phone, a tablet computer, a laptop computer, a notebook computer, a desktop computer, a server computer, or other suitable computing devices. A computing device 200 can include components or units, such as a processor 202, a bus 204, a memory 206, peripherals 214, a power source 216, a network communication unit 218, a user interface 220, other suitable components, or a combination thereof.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a computing device 200 can include volatile memory, such as RAM, and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof, to perform various functions described herein. For example, the executable instructions 208 can include instructions to receive requests for status information about nodes executing on a server, transmit responses to the requests, and update data stored in a database (e.g., the database 118). The application data 210 can include, for example, user files, database catalogs or dictionaries, configuration information or functional programs, such as a web browser, a web server, a database server, or a combination thereof. The operating system 212 can be, for example, Microsoft Windows®, Mac OS X®, or Linux®, an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the computing device 200 itself or the environment around the computing device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200, as can be contemplated. In some implementations, the power source 216 can be a battery, and the computing device 200 can operate independently of an external power distribution system. Any of the components of the computing device 200, such as the peripherals 214 or the power source 216, can communicate with the processor 202 via the bus 204.

The network communication unit 218 can also be coupled to the processor 202 via the bus 204. In some implementations, the network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; or any other suitable human or machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display (e.g., an OLED display), or other suitable display.

In some implementations, a client or server can omit the peripherals 214. The operations of the processor 202 can be distributed across multiple clients or servers, which can be coupled directly or across a local area or other suitable type of network. The memory 206 can be distributed across multiple clients or servers, such as network-based memory or memory in multiple clients or servers performing the operations of clients or servers. Although depicted here as a single bus, the bus 204 can be composed of multiple buses, which can be connected to one another through various bridges, controllers, or adapters.

Figure 3:
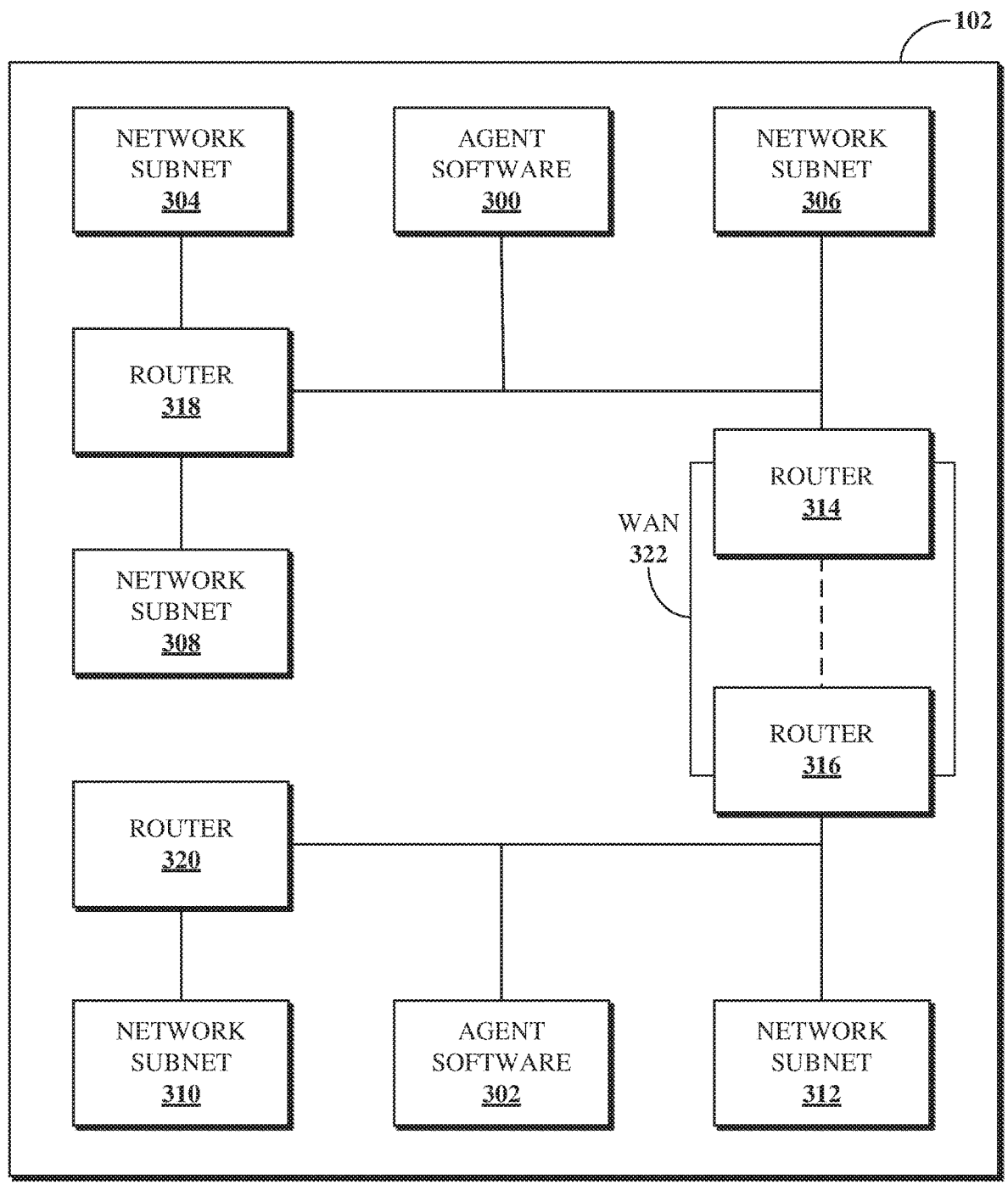
FIG. 3 is a block diagram of examples of network subnets associated with network segments of a customer environment.

FIG. 3 is a block diagram of examples of network subnets of a computer network. The computer network can be a network operating within a customer environment, such as a customer environment 102 of the system 100. In some implementations, the customer environment can include hardware and software resources under the partial or total control of the customer environment 102. A computer network can include one or more agent software instances, such as the agent software instances 300, 302. An agent software instance 300, 302 can be software facilitating communication and movement of data between software executing outside of the customer environment and hardware or software executing within the customer environment. For example, an agent software instance 300, 302 can perform operations to identify hardware or software components of a computer network within a customer environment. The agent software instance 300, 302 can also perform operations to identify network subnets of the computer network, which network subnets can be associated with one or more of the identified hardware or software components.

An agent software instance 300, 302 can have a number of network subnets accessible to it. For example, the agent software instance 300 can directly access the network subnets 304, 306, and 308 and the agent software instance 302 can directly access the network subnets 310 and 312. A "network subnet" or "subnet" as used herein refers to a logical subdivision of a computer network, such as an Internet Protocol (IP) network (although other networking technologies may also be used). In some implementations, a subnet can include all devices on a segment of a network provided by a particular piece of network hardware (e.g., devices connected to a network switch). In some implementations, a physical network can have multiple subnets (e.g., one set of devices in one subnet, a second set of devices in a second subnet, and a third set of devices in both subnets, or some other combination of subnets and devices). Components of the computer network can be used to route traffic between subnets, such as the routers 314, 316, 318, 320, which routers 314, 316, 318, 320 can be hardware or software. The routers 314, 316, 318, 320 can be configured to route traffic between two network subnets, such as the network subnets 306 and 312, to facilitate communications between components of those network subnets.

For example, IP routing techniques such as static routing, dynamic routing, or a combination thereof can be used to facilitate the routing of network packets to the appropriate subnet. In some implementations, a routing device has a network gateway address associated with the routing device for each subnet for which the routing device can route network packets. For example, the router 318 can have a gateway address for the network subnets 304, 306, and 308. Network connected devices in the subnet 304 may be configured, for example, to send packets destined to subnets outside of the subnet 304 to the gateway address of the router 318 so that the router 318 can then forward the packet to the destination subnet or another router device that may be able to access the destination subnet or another routing device that may be able to access the destination subnet. The other routing devices shown may also have network gateway addresses for the respective subnets to which they are connected.

In some implementations, the components of a network subnet can be associated with that network subnet based on a subnet mask configured by a user, such as a network administrator of a customer environment. The subnet mask can be used, for example, to identify a network portion of a network address and a host portion of a network address, where the network portion of the network address is representative of the subnet. In some implementations, a subnet mask can be associated with a network class indicating leading bits of an IP address for subnets included in the subnet mask and a routing prefix associated with those subnets. For example, a number of leading bits having values of 1 of the IP address can indicate an IP range for the network identifier. Similarly, a routing prefix for the subnets is indicated based on the IP range such that a corresponding number of host bits can be determined based on the leading bit values of the IP address. For example, where the first two leading bits have a value of 1, the IP range for the network identifier is between 192.0.0.0 and 223.255.255.255, with the routing prefix being /24 such that 8 bits are attributed to a host. In some implementations, a network identifier and a host identifier associated with a network subnet can be determined based on a component associated with a discovered network subnet. For example, one or both of the network identifier or the host identifier can be identified based on a CI representative of a computer network component that is discovered using the agent software instance, for example, where the CI stores information about its network or host.

The routing of data or the like between network subnets can utilize network interfaces of the software or hardware devices associated with the network subnets. In some implementations, where the routing of data is occurring in a VPN, a first software component associated with a first network subnet can have a network interface to a second software component associated with a second network subnet. For example, a virtual machine can have a network interface to another virtual machine in the VPN. In some implementations, a first software component associated with a first network subnet can have a network interface to a port of a hardware component associated with a second network subnet. For example, a virtual machine can have a network interface to a port of a computing device. In some implementations, a first hardware component associated with a first network subnet can have a network interface to a port of a second hardware component associated with a second network subnet. For example, a port of a first computing device in a customer environment can transmit data to a port of a second computing device in the customer environment.

Routers can be used to permit communication between different geographical locations, such as through WANs, the Internet, VPNs, or the like. For example, as shown in FIG. 3, the routers 314 and 316 can be connected by a WAN 322 link or a VPN over an internet connection. The router 314 can be located in a first geographical region, for example, the state of California, while the router 316 can be located in a second geographical region, for example, the state of New York.

An agent software instance 300, 302 can perform operations to identify network subnets of the computer network and hardware or software components of the computer network associated with those network subnets. The agent software instance 300, 302 can communicate with other software or hardware components of the computer network using a network interface of a computing device on which the agent software instance 300, 302 is executed. The information about discovered network subnets can be used to generate a discovery profile for performing subsequent discovery operations with respect to those network subnets (e.g., without having to reconfigure the particular portion of the computer network on which to perform discovery operations). Performing the operations for identifying network subnets can include an agent software instance 300, 302 obtaining information about a router 314, 316, 318, 320 of the computer network, which router 314, 316, 318, 320 can be used to identify further network subnets accessible through the router 314, 316, 318, 320. The router 314, 316, 318, 320 or the network subnets identified responsive to obtaining the information about the router 314, 316, 318, 320 can be included in the discovery profile generated for the agent software instance 300, 302.

The foregoing description relating to FIG. 3 describes only some implementations of computer networks, network subnets, and agent software instances. Other implementations are possible, including those that include additional, less, or different hardware or software components that are described. For example, different implementations of agent software instances can be used; discovery profiles can be generated for agent software instances spanning network boundaries, such as WAN connections; boundaries between discovery profiles or agent software instances can be determined differently; virtual machines or virtualized networks can be utilized, or combinations thereof. In another example, the agent software instance 300, 302 can be executed within a virtual machine executing on a computing device or otherwise be a virtual machine.

In the example shown in FIG. 3, two agent software instances 300 and 302 can be installed to minimize, reduce, or eliminate the need for an agent to identify network subnets or perform other actions across a WAN or VPN, such as shown between the routers 314 and 316 across the WAN 322. In some implementations, the agent software instance 300, 302; software for managing discovery operations performable by the agent software instance 300, 302 (not shown); or a combination thereof can include information that establishes or defines network boundaries between or around the agent software instances 300, 302. For example, a boundary can be defined based on known network gateway addresses for WAN or VPN links, based on pre-determined desired boundaries, based on detection of routers connected to the Internet (or a WAN or VPN), detection of a network firewall, or the like. Other configurations are also possible for establishing or defining network boundaries between or around agent software instances operating in a computer network. For example, software-defined network can be leveraged to segment the computer network into multiple subnetwork segments, such as by virtualizing the network segments and instantiating virtual machines for operating the agent software instances.

In some implementations, the software for managing discovery operations is executed in a datacenter, such as the datacenter 108 shown in FIG. 1. For example, the software for managing discovery operations can be an instance of platform software or other software executing on the application node 114 using and storing data in the database node 118 and can be provided, for example, as a PaaS service, an SaaS service, or a combination thereof. In some implementations, the software for managing discovery operations can be executed within a customer environment, such as the customer environment 102, and not be provided as a PaaS service, an SaaS service, or a combination thereof.

Figure 4:
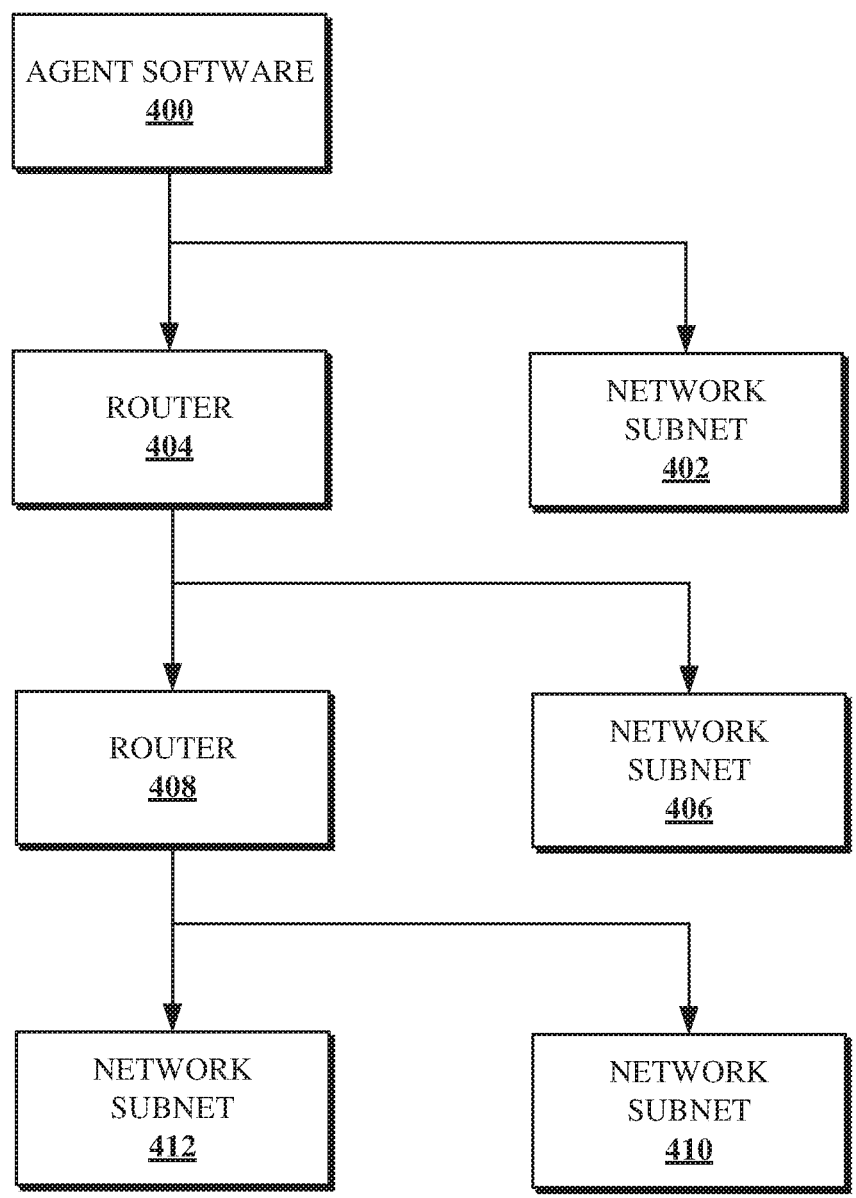
FIG. 4 is a block diagram of an example of a hierarchy of discovered components of a computer network.

FIG. 4 is a block diagram of an example of a hierarchy of discovered components of a computer network. An agent software instance 400 selected for generating a discovery profile for performing discovery of the computer network performs an operation for discovering network subnets of a computer network by identifying a router 404 associated with the agent software instance 400 and a network subnet 402 accessible by the agent software instance 400. In some implementations, the network subnet 402 is the network subnet to which the computing device on which that agent software instance 400 is executed is connected and the router 404 is located using the network gateway address of a router 404 to which the network subnet is connected. Such discovery profiles may be generated, for example, using MID server software provided by ServiceNow, Inc. of Santa Clara, Calif.

In some implementations, the computing device on which agent software instance 400 is executed can be configured with the network gateway address for the router 404. The router 404 can thus be a hardware or software component usable to access components of the computer network associated with other network subnets not directly accessible by the agent software instance 400. For example, the network subnet 402 can be associated with the router 404 directly accessible by the agent software instance 400, which direct accessibility is characterized by the ability of the agent software instance 400 to communicate with other hardware or software connected to the network subnet 402 without routing the communication through a network gateway address, such as a network gateway address of the router 404. In another example, the network subnet 406 can be associated with the router 408 not directly accessible by the agent software instance 400 because the agent software instance 400 communicates with the network subnet 406 through a network gateway address of the router 404.

The discovery of one router, such as the router 404, can result in the discovery of another router, such as the router 408 or 412. For example, there can be a number of routers directly accessible by the agent software instance 400. There can further be a number of routers directly accessible by network subnets associated with network gateway addresses of one or more of the routers directly accessible by the agent software instance 400. As such, in some implementations, the agent software instance 400 can discover a first network subnet 402 directly accessible by the agent software instance 400 and a first router 404 directly accessible by the agent software instance 400. The agent software instance 400 can then discover a second network subnet 406 associated with the first router 404 and a second router 408 accessible by the first router 404, which second network subnet 406 might not be accessible by the agent software instance 400 without communicating through the first router 404. The agent software instance 400 can then discover a third network subnet 410 associated with the second router 408 and a third router 412 accessible by the second router 408, which third network subnet 410 might not be accessible by the agent software instance 400 without communicating through the second router 408.

An agent software instance 400 can be configured to terminate a discovery operation for identifying network subnets of a computer network upon the occurrence of an event. This can help to prevent the computer network discovery from taking an undesirably long period of time or from discovering components undesirably distant from the initial starting point of the discovery operation (e.g., the agent software instance 400), such as by geographical distance or number of routers. For example, the agent software instance 400 can terminate the discovery operation upon discovering a specified maximum number of components or network subnets of the computer network. In another example, the agent software instance 400 can terminate the discovery operation upon discovering a specified network subnet or a specified network gateway address within the computer network. In another example, the agent software instance 400 can terminate the discovery operation upon discovering a specified hardware or software component of the computer network. In another example, the agent software instance 400 can terminate the discovery operation upon a specified period of time (e.g., a time limit) having elapsed since the beginning of the operation. In another example, the agent software instance 400 can ignore network subnets where accessing those network subnets would include traversing more than a number (e.g., three) of network subnets or routers.

A discovery operation performed by the agent software instance 400 to identify network subnets can result in the agent software instance 400 discovering network subnets using different paths. For example, a first path can direct the agent software instance 400 to a first network gateway address to discover network subnets of a first geographical location while a second path can direct the agent software instance 400 to a second network gateway address to discover network subnets of a second geographical location. In some implementations, the agent software instance 400 can terminate the discovery operation with respect to one or more, but fewer than all, of the paths directing the agent software instance 400. For example, a user can specify that the agent software instance 400 terminate a discovery operation path within the state of New York upon discovering a first network subnet associated with a component located in New York, but that other discovery operation paths can continue processing. Geographical locations of network subnets or components can be identified, for example, such as described later with respect to FIG. 5.

Figure 5:
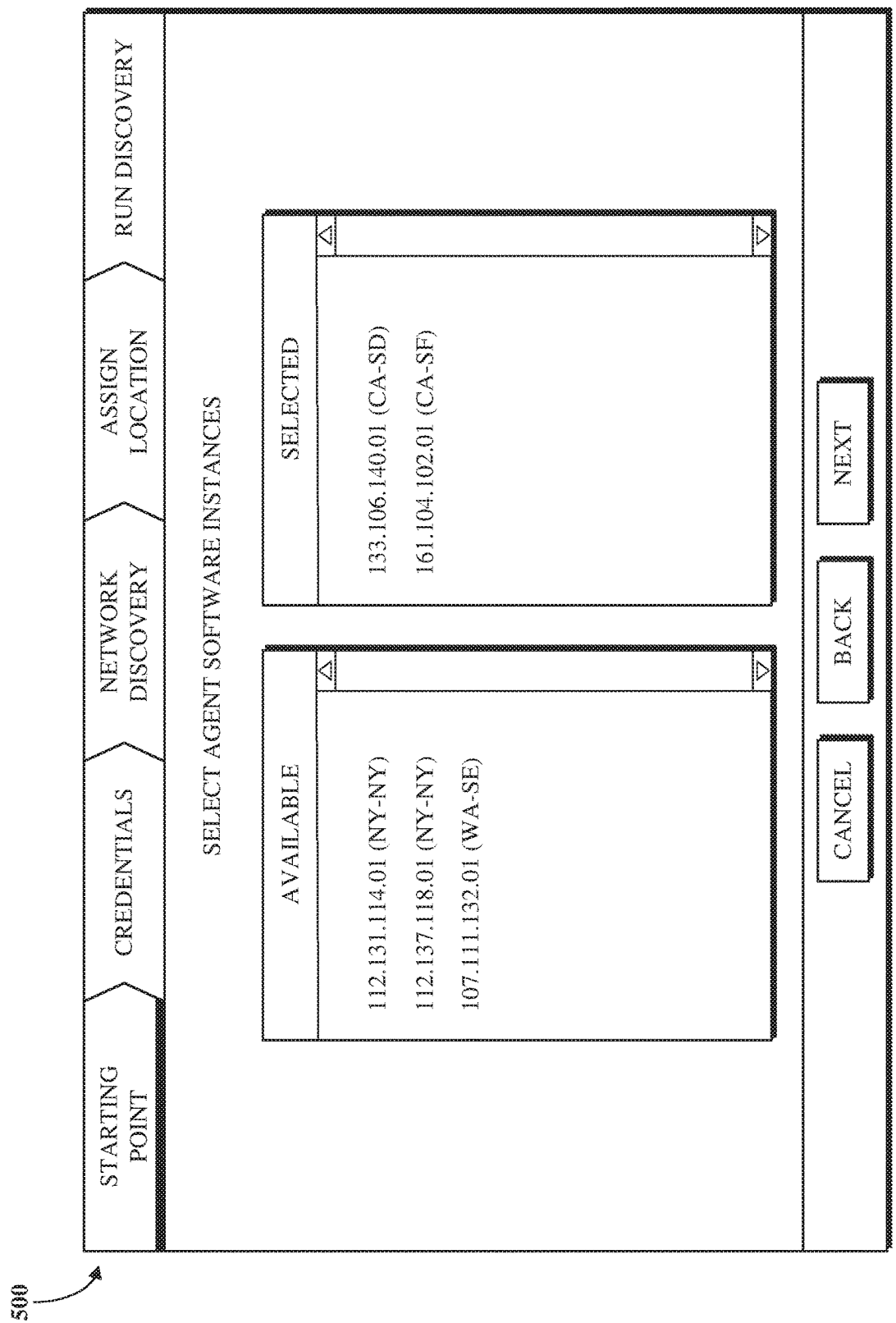
FIG. 5 is an illustration of an example of a user interface of a software wizard for generating discovery profiles for discovering components of a computer network.

FIG. 5 is an illustration of an example of a graphical user interface 500 of a software wizard for generating discovery profiles for discovering components of a computer network. The software wizard can be executed on a computing device, for example, a server device located in a datacenter (e.g., the datacenter 108 of the system 100). The software wizard can be accessed by a client in communication with the customer environment (e.g., the client 104 of the system 100).

The graphical user interface 500 can comprise part of a software graphical user interface constituting data that reflect information ultimately destined for display on a hardware device, such as a client 104. For example, the data can contain rendering instructions for bounded graphical display regions, such as windows, or pixel information representative of controls, such as buttons and drop-down menus. The rendering instructions can, for example, be in the form of HTML, SGML, JavaScript, Jelly, AngularJS, or other text or binary instructions for generating a graphical user interface on a display that can be used to generate pixel information. A structured data output of one device can be provided to an input of the hardware display so that the elements provided on the hardware display screen represent the underlying structure of the output data.

The graphical user interface 500 includes a list of candidate agent software instances operating within a customer environment. A user can select one or more agent software instances of the candidate list as starting points for generating discovery profiles for performing discovery operations on components of the computer network. In that an agent software instance has a unique address and location within the computer network, the selected agent software instances use different starting points for operations performable to identify network subnets of the computer network. In some implementations, a candidate agent software instance can be an agent software instance available for performing an operation to identify network subnets based on its having registered to software executing on a server device in a datacenter.

The graphical user interface 500 can include two lists for displaying the agent software instances. For example, a first list can include a list of available (e.g., candidate) agent software instances operating within the customer environment, and a second list can include a list of agent software instances selected from the first list. Agent software instances selected from the first list can be removed from the first list upon being added to the second list. In some implementations, all of the available agent software instances can be selected such that operations for identifying network subnets can be performed in parallel by all of them. However, while this can have a greatest effect on identifying components of the computer network, it can also consume a greater amount of system and network resources than, for example, performing the operations for identifying network subnets in serial by selected agent software instances.

In some implementations, the graphical user interface 500 can prompt the user to select one or more routers instead of or in addition to selecting one or more agent software devices. For example, the graphical user interface 500 can include a list of available routers based on their IP addresses where the routers are associated with an agent software instance operating in the customer environment. When a router is selected to initiate an operation for identifying network subnets of a computer network, the agent software instance associated with the router (e.g., the agent software instance that can directly access the network subnet associated with the router) can be selected for performing the operation. A discovery profile can then be generated for the agent software instance associated with the selected router.

The network subnets accessible by an agent software instance can be determined based on the IP address of the agent software instance. In some implementations, the IP address of the agent software instance can represent the IP address of hardware components executing the agent software in the computer network. In some implementations, the IP address of the agent software instance can represent a gateway associated with the agent software instance. Responsive to an agent software instance discovering a network subnet associated with a network gateway address (e.g., of a router), the agent software instance can probe that network gateway address to discover other network subnets that are associated with it, but which are not associated with network gateway addresses or other network components previously accessible by the agent software instance.

The agent software instance can use a network gateway address to identify other network subnets associated with it. The agent software instance can use one or more techniques to identify network subnets using a network gateway address, such as but not limited to the ones now described. In some implementations, the software for managing discovery operations (e.g., platform software executing at the datacenter 108 shown in FIG. 1) can send instructions to the agent software instance to identify network subnets associated with the network gateway address by probing a router having the network gateway address. The agent software instance can receive credentials (e.g., SNMP credentials) to access a hardware or software component via the network gateway address where the hardware or software component is accessible through the network gateway address or an associated address. Once the agent software instance access the component, it can identify subnets associated with the component and transmit a list of those subnets to the software for managing discovery operations. The software for managing discovery operations, which can use the credentials to query a CMDB for CIs representing those hardware or software resources. The subnets associated with those CIs can be sent back to the agent software instance, which can then use those subnets to identify other subnets and other network gateway addresses accessible using those subnets. Implementations for receiving or identifying credentials are discussed below. In some implementations, a router associated with a network gateway address can be a Dynamic Host Configuration Protocol (DHCP) server, in which case the agent software instance can probe it to discover other network subnets by sending a request for a subnet mask used by the DHCP server thereto.

An operation for identifying network subnets of a computer network can be performed as discussed with respect to FIG. 4 to generate a discovery profile for an agent software instance. In some implementations, in addition to generating the discovery profile, the operation can also be performed to identify a list of discovered network subnets of the computer network, a list of discovered components of the computer network associated with those network subnets, a list of network gateway addresses (e.g., IP addresses of routers and next hop routers within the computer network), or a combination thereof. A discovery profile can be generated to include information about the discovered network subnets, components, or network gateway addresses of the computer network, such as IP addresses, identifiers unique to the computer network, status information, type information, or the like. The discovery profile can be associated with the one or more agent software instances selected via the graphical user interface 500. In this way, the discovery profile can indicate the known network subnets, components, or network gateway addresses associated with it for use in further discovery operations performable starting with the one or more agent software instances.

In some implementations, in addition to generating the discovery profile, the operation for identifying network subnets can also be performed to generate CIs representative of respective network subnets, components, network gateway addresses, or the like, which CIs can be stored in a CMDB associated with the computer network. In some implementations, where a CI representative of a discovered network subnet, component, network gateway address (e.g., a router associated with the network gateway address), or the like is already stored in the CMDB, the CI can be updated if data identified by the performed operation indicates a change in the information of the CI, or the CI can otherwise be left unchanged.

Although not shown in FIG. 5, the software wizard can include additional user interfaces including user interface elements for displaying data on a client or receiving commands from the user. Additionally, the graphical user interface 500 of the software wizard and other graphical user interfaces thereof can include navigation buttons. For example, the software wizard can include a "Cancel" button to exit the software wizard without making changes or taking further action, a "Back" button to return to a previous user interface of the software wizard (to the extent available), or a "Next" button to proceed to a following user interface of the software wizard (to the extent available). In some implementations, the software wizard can include a "Done" button to submit information identified using the software wizard (e.g., discovered components, discovered network subnets, or geographical locations of discovered components or network subnets).

For example, another graphical user interface of the software wizard can be a user interface for allowing the user to input credentials, such as SNMP or other credentials, for accessing and thus discovering components of the computer network. It is possible that some components might not be discoverable without valid credentials being available, so the receipt of such credentials prior to performing operations to discover network subnets can prevent or at least limit the number of interruptions caused by inaccessible components. In some implementations, the user can input credentials for the computer network components manually or by referencing or otherwise pointing to a data source, for example, a comma-separated value file, a database, a table, or the like. Inputting credentials for use by the software wizard can include granting the software wizard access to an IP table having entries indicative of credentialed connections between hardware or software in the computer network.

In another example, another graphical user interface of the software wizard can be a user interface for displaying a progress of the one or more operations performed based on the agent software instances selected at the graphical user interface 500. A list of discovered components of the computer network can be updated on this other graphical user interface during the one or more operations. A progress bar showing a percentage completion of the one or more operations can be included in this other graphical user interface.

In another example, another graphical user interface of the software wizard can be a user interface for indicating geographical location information associated with discovered components of the computer network or receiving commands from a user of the software wizard to associate discovered components of the computer network with indicated geographical locations. In some implementations, this user interface can include a hierarchical display of geographical locations that can be associated with components of the computer network. For example, the hierarchical display can include a list of continents at a highest level and a list of cities at lowest levels corresponding to respective continents. A list of those discovered components not associated with a geographical location can be indicated such that the user can select one such discovered component from the list and associate a geographical location with it (e.g., by manual input, such as typing the continent, country, city, etc.; by action, such as clicking and dragging a such discovered component from the list to a level of the hierarchical display; or the like).

The list can also include discovered components that already have associated geographical locations, which can be indicated differently than those discovered components not already associated with geographical locations (e.g., using a symbol, such as an asterisk). The geographical locations available for associating discovered components can be presented in implementations other than a hierarchical display, such as in a pull-down or drop-down menu. In some implementations, network subnets discovered using the software wizard can be associated with geographical locations, for example, based on a known geographical location of a component indicating an address of the network subnet.

In another example, another graphical user interface of the software wizard can be a user interface for scheduling a discovery operation using the discovery profile generated for the one or more agent software instances selected on the graphical user interface 500. In some implementations, a discovery operation associated with a discovery profile can by default be scheduled to be performed once per day. In some implementations, the periodicity for scheduling a discovery operation associated with a discovery profile, or the nature of an event the occurrence of which triggers the performance of the discovery operation, can be configured by a user of the software wizard.

Implementations for discovering components of a computer network and generating discovery profiles associated with discovered components can include additional, less, or otherwise different functionality than is described above, or combinations thereof. In some implementations, a software wizard is not available for selecting agent software instances to discover computer network components and generate discovery profiles. For example, a user, such as a network administrator, having visibility into the computer network can manually cause one or more agent software instances to perform discovery of subnets associated with respective agent software instances, such as by accessing an agent software instance itself or directly transmitting commands indicating the discovery performance request to a computing device executing an agent software instance.

The selection of agent software instances for discovering computer network components may be determined based on information input by a user, such as a network administrator. For example, the information input can include a request to select one or more agent software instances based on an IP address, an IP range, an IP network, a host name, or a capability. A list of candidate agent software instances that satisfy the request can be generated or otherwise identified including information indicative of those agent software instances of the computer network that satisfy the request. For example, where the request includes a request for agent software instances having an IP address included within a defined IP range and a capability matching the defined capability (e.g., the ability of the agent software instance or the computing device on which it executes to transmit or receive data over the Secure Shell protocol (SSH), the compatibility of the agent software instance or the computing device on which it executes with Windows Management Instrumentation (WMI), or the like), the list can include those agent software instances satisfying the request. In some implementations, the input can be processed using an Application Programming Interface (API) associated with agent software instantiated into the agent software instances.

The request can include another identifier for an agent software instance, such as an identifier for the agent software instance or computing device executing the agent software instance within the computer network. In some implementations, the request can include a request for a cluster of agent software instances, for example, by requesting one or more specific agent software instances such that the entire cluster including the specified agent software instances is returned or by requesting an agent software instance cluster.

Where no IP address, IP range, or IP network is specified within the request, the resulting candidate agent software instance list can include every agent software instance operating within the computer network or, to the extent a capability is also specified in the request, those agent software instances that satisfy the capability. An agent software instance operating within the computer network that does not have an IP range associated with it can be used to perform operations to identify network subnets without limitation as to a target IP address defined in the request. An agent software instance operating within the computer network that does not have a capability associated with it can be used to perform operations to identify network subnets without limitation as to capability.

An optimal candidate agent software instance of the list can be selected for performing the operation to identify network subnets based on a weight, rank, or other degree to which the optimal candidate agent software instance more fully satisfies the request as compared to other candidate agent software instances of the list. In some implementations, an agent software instance to be used for performing the operation to identify network subnets can be randomly selected from the list.

The one or more agent software instances to be used for performing operations to identify network subnets of a computer network can be selected based on other characteristics or factors. For example, one or more agent software instances having the lowest network latency or highest connection strength can be selected based on or independent of a request input by a user. In another example, one or more agent software instances can be selected on a round-robin basis. In another example, one or more agent software instances can be selected based on a geographical proximity to a computer network component (e.g., based on an IP address of the component). In yet another example, one or more agent software instances can be selected based on a number of pending processes for them (e.g., such that an agent software instance having a least number of pending processes is optimal), which processes can be or include discovery operations or other processes or operations for communicating data between components within the customer environment and hardware or software outside of the customer environment.

Information included in a request can be used to specify limitations on an operation to be performed by one or more agent software instances in addition to or instead of specifying the one or more agent software instances themselves. For example, an IP range or IP network included in a request can specify that an operation to be performed by some agent software instance is to discover network subnets or the like associated with the specified IP range or IP network.

FIG. 6 is an illustration of an example of a hierarchy of discovered components of a computer network according to geographical locations of the components. As discussed above, the hierarchy can include a first level corresponding to a larger geographical area than subsequent layers. As shown in the figure, a first layer of the hierarchy corresponds to the United States of America; a second layer corresponds to states, including California, New York, and Washington; and a third layer corresponds to cities within those states, including San Diego and San Francisco within California. In some implementations, the hierarchy can be displayed using collapsible objects. For example, the hierarchy can include visual elements that can be toggled by a user to expand a corresponding layer of geographical location or named geographical location. In another example, layers of geographical locations or named geographical locations of the hierarchy that do not include computer network components associated with them might not be interactive.

Figure 7:
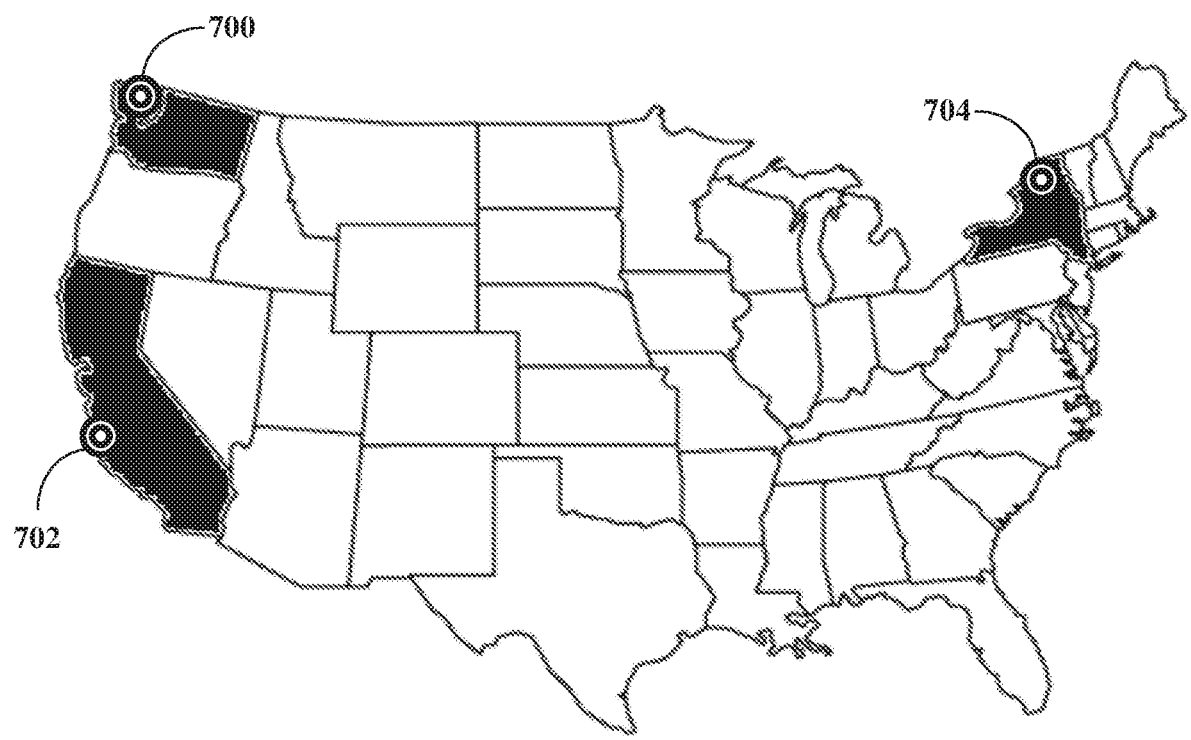
FIG. 7 is an illustration of an example of a geographical map at a first level of geographical abstraction associated with components of a computer network.

FIG. 7 is an illustration of an example of a geographical map at a first level of geographical abstraction associated with components of a computer network. A network topology map can be generated responsive to geographical locations being associated with discovered components of the computer network. The network topology map can include varying levels indicating degrees of geographical abstraction. In some implementations, the varying levels can correspond to levels of a hierarchy, such as the hierarchy discussed with respect to FIG. 6. For example, a first level of geographical abstraction can correspond to a continent, a country, or a state, such that a second level of geographical abstraction can respectively correspond to a country, a state, or a city, and so on. In another example, a first level of geographical abstraction can correspond to geographical locations of an entire computer network, such that a second level of geographical abstraction can correspond to locations of a network segment of the computer network, a third level of geographical abstraction can correspond to locations of a subset of network subnets of the network segment, and so on.

A geo-location identifier can be associated with a network subnet discovered in a computer network. The geo-location identifiers of discovered network subnets can be used to generate the network topology map, for example, by populating levels of the network topology map based on degrees of geographical abstraction corresponding to the geo-location identifiers. In some implementations, a network administrator of a customer environment can use the software wizard discussed with respect to FIG. 5 to discover a list of network subnets and then associate geographical locations with respective discovered network subnets. For example, referring to the hierarchy discussed with respect to FIG. 6, an agent software instance can perform an operation to discover network subnets located in the states of California, New York, and Washington. A geo-location identifier can be associated with respective discovered network subnets in each of those states. A geographical map of a level of geographical abstraction can include indicators associated with those geo-location identifiers. For example, at a first level of geographical abstraction, the geographical map can represent the United States and include the indicator 700 associated with the geo-location identifier for the state of Washington, the indicator 702 associated with the geo-location identifier for the state of California, and the indicator 704 associated with the geo-location identifier for the state of New York.

The geographical identifiers associated with subnets can automatically be assigned, such as based on known geographical locations of certain subnets, based on known location of components within the subnet (e.g., based on a GPS location of a mobile device within a subnet), or other location information that can be discovered relating to the subnet. An automatic determination of the geographical location of a subnet can be performed, for example, during the generation of a discovery profile including the network subnet, the performing of discovery for the subnet, or a combination thereof.

Figure 8:
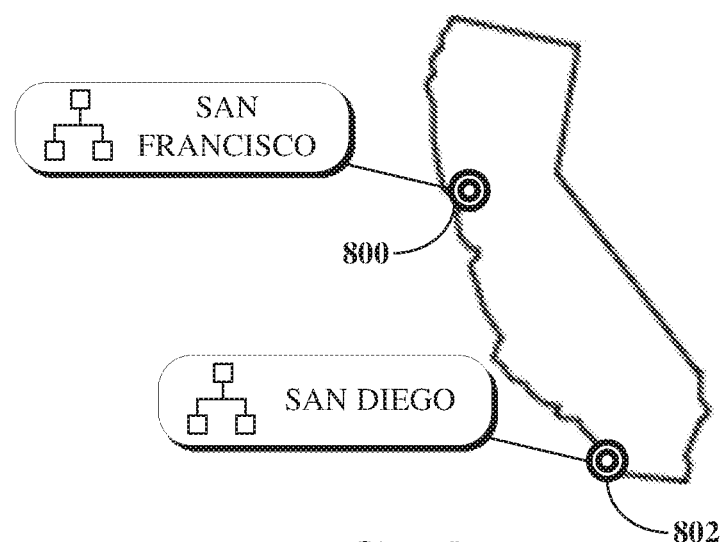
FIG. 8 is an illustration of an example of a geographical map at a second level of geographical abstraction associated with components of a computer network.

FIG. 8 is an illustration of an example of a geographical map at a second level of geographical abstraction associated with components of a computer network. The second level of geographical abstraction can correspond to a level lower than a corresponding first level of geographical abstraction with a hierarchy. For example, where a geographical map of a first level of geographical abstraction shows a map of the United States, a geographical map of a second level of geographical abstraction can show a state, such as the state of California. For example, the hierarchy discussed with respect to FIG. 6 (which was generated based on the operation performed for generating a discovery profile using the software wizard of FIG. 5) shows that network subnets were discovered within San Diego and San Francisco. The geographical map of FIG. 8 accordingly includes the indicator 800 corresponding to network subnets discovered to have geo-location identifiers associated with San Francisco, Calif., and the indicator 802 corresponding to network subnets discovered to have geo-location identifiers associated with San Diego, Calif. In some implementations, a geographical map at a third level of geographical abstraction (not shown) can correspond to one of those cities to show a more detailed view of the locations of the discovered network subnets having geo-location identifiers associated with that city. For example, an indicator can correspond to network subnets associated with components operating at a particular address within San Diego, Calif.

Implementations of maps indicating levels of geographical abstraction can include additional, less, or different functionality than is described above, or a combination thereof. In some implementations, a map can include locations of network subnets (indicated based on geo-location identifiers associated with the discovered network subnets) according to a Layer 2 or Layer 3 network map. In another example, a graphical user interface displaying a map can use different types of user interface elements to represent on-premises components of a computer network and cloud-based components thereof. For example, user interface elements of the graphical user interface for representing one of on-premises components or cloud-based components of the computer network can include highlighting to represent respective components in distinct colors (e.g., green for on-premises components and blue for cloud-based components), altering the font for respective components to represent those components using distinct styles (e.g., bolding only cloud-based components within the hierarchy shown in FIG. 6), using symbols to represent respective components (e.g., "OP" for on-premises components or "CB" for cloud-based components"), or the like or a combination thereof. In some implementations, a graphical user interface can output one or more maps to a display of a client. The graphical user interface can include a frame for displaying a presently selected map and user interface elements for allowing a user of the client to toggle between the maps. For example, the maps available for viewing on the graphical user interface can include maps corresponding to varying levels of geographical abstraction, maps showing network information (e.g., Layer 2, Layer 3, network segmentation, or the like), maps showing cloud-based network subnet locations versus on-premises network subnet locations, maps showing network subnets associated with a customer service environment (e.g., network subnets associated with hardware or software components used to deliver an email service within the computer network), maps showing network subnets associated with hardware components versus network subnets associated with software components, or the like.

A user can interact with a map to initiate the performance of an operation for discovering network subnets. The network subnets to be discovered (or rediscovered, as the case may be) can be those having geo-location identifiers associated with a portion of a map interacted with by a user (e.g., by the user clicking on it). In some implementations, those network subnets can include network subnets shown on multiple levels of geographical abstraction. For example, where a user clicks on the Pacific Coast of the United States to rediscover network subnets associated therewith, the network subnets to be discovered (or rediscovered) can include network subnets associated with the state of California. In some implementations, the user can input one or more specified geographical locations such that the discovery can be performed for network subnets associated with those specified geographical locations.

In some implementations, a user can interact with a map to perform other actions besides discovery operations. For example, a user can select a portion of a map to test the credentials for components associated with the network subnets located within that portion. In another example, the user can select a portion of a map to retrieve CI information corresponding to the components associated with the network subnets located within that portion. In another example, the user can add a new network subnet or associated component to a selected portion of the map.

In some implementations, a map can display information associated with network subnets, which information can be used for information technology service management. For example, the map can show network subnets associated with components affected by a power outage or other event, network subnets associated with components involved in a computer systems update, network subnets associated with components involved in an incident reported by a customer, or the like.

Figure 9:
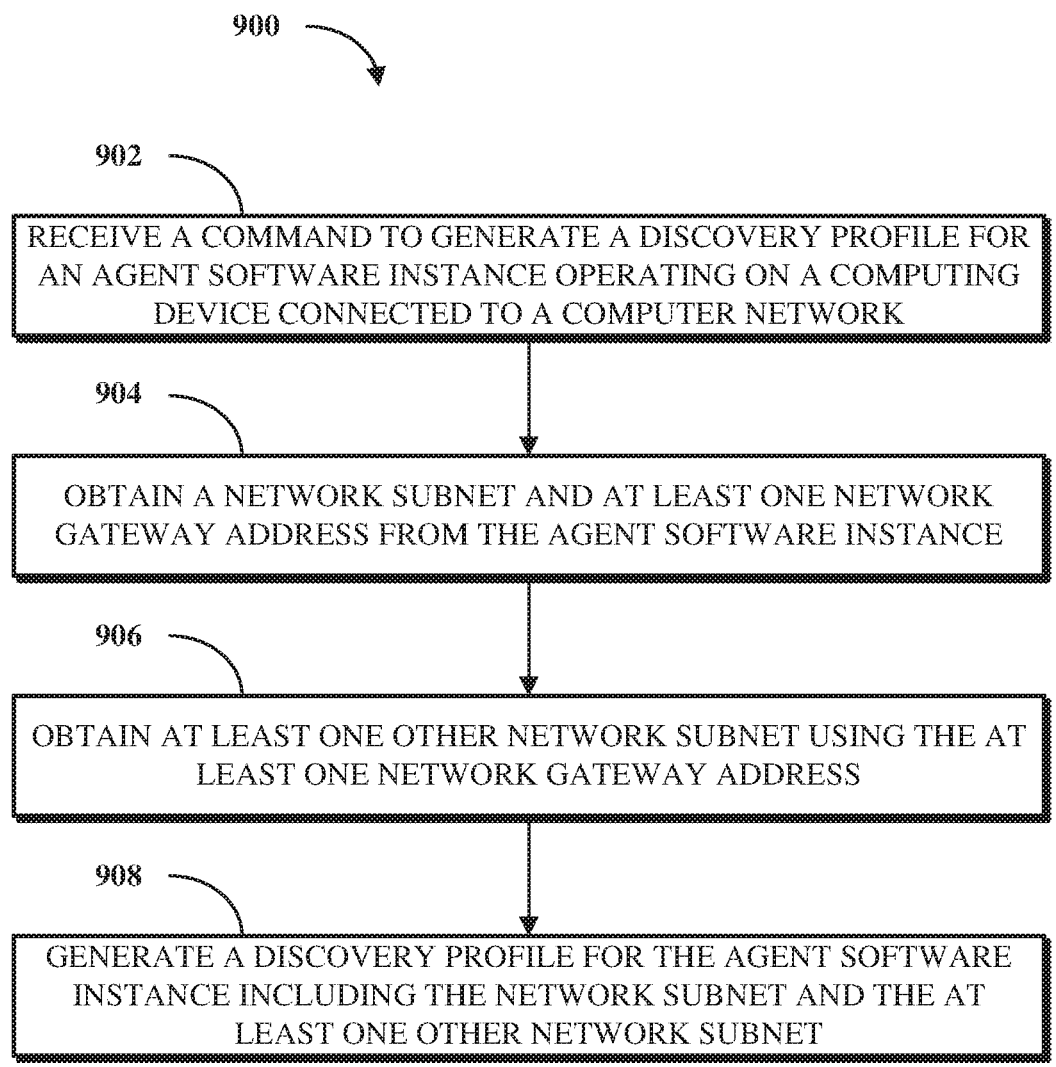
FIG. 9 is a flowchart illustrating an example of a technique for generating discovery profiles for discovering components of a computer network.
Figure 10:
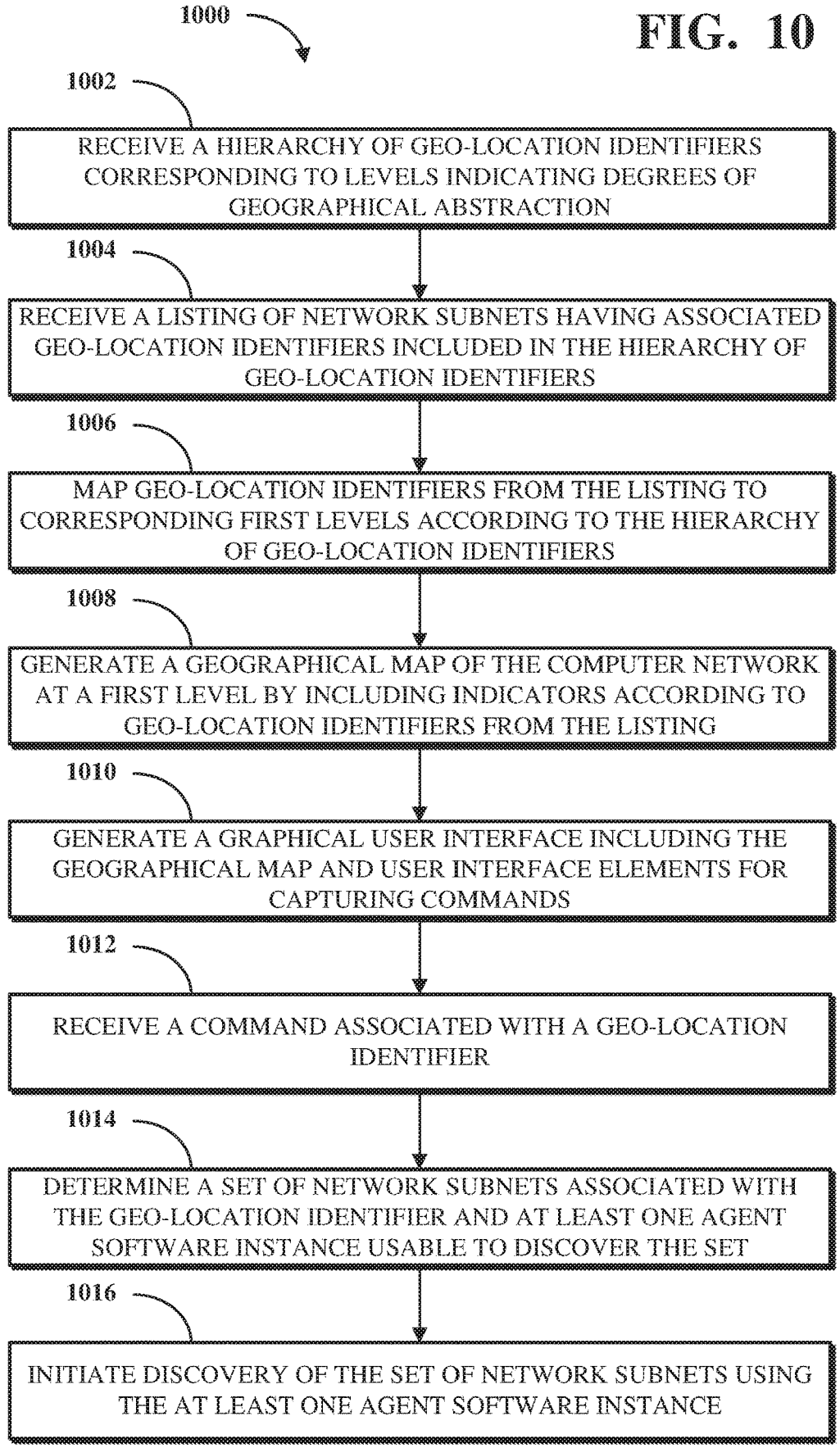
FIG. 10 is a flowchart illustrating an example of a technique for initiating discovery of components of a computer network using geographical abstraction.

FIG. 9 is a flowchart illustrating an example of a technique 900 for generating discovery profiles for discovering components of a computer network. FIG. 10 is a flowchart illustrating an example of a technique 1000 for initiating discovery of components of a computer network using geographical abstraction. In some implementations, the technique 900 or the technique 1000 can be executed using computing devices, such as the systems, modules, or devices described with respect to FIGS. 1 and 2. In some implementations, the technique 900 or the technique 1000 can be performed, for example, by executing a machine-readable program or other computer-executable instructions, such as instructions or programs described according to JavaScript, C, or other such instructions. The steps, or operations, of the technique 900 or the technique 1000, or any other method, process, or algorithm described in connection with the implementations disclosed herein, can be implemented directly in hardware, firmware, software executed by hardware, circuitry, or a combination thereof.

Referring now to FIG. 9, in some implementations, the technique 900 includes receiving a command to generate a discovery profile for an agent software instance operating on a computing device connected to a computer network 902, obtaining a network subnet and at least one network gateway address from the agent software instance 904, obtaining at least one other network subnet using the at least one network gateway address 906, and generating a discovery profile for the agent software instance including the network subnet and the at least one other network subnet 908.

At 902, a command to generate a discovery profile for an agent software instance can be received. In some implementations, the command can include a selection of the agent software instance from a list of available agent software instances operating within a computer network. In some implementations, the command can include a request to select an agent software instance from a list of available agent software instances based on characteristics of the computer network. For example, the command can include a request to select an agent software instance having an IP address included within a specified IP range. In some implementations, the command can include a request for an agent software instance to be selected without specification from the user, for example, based on network latency, a round-robin system, random selection, or the like.

At 904, a network subnet and at least one network gateway address are obtained. The network subnet and at least one network gateway address can be obtained via a first stage of an operation to identify network subnets performed using the agent software instance selected at 902. The network subnet can be a network subnet associated with a component of the computer network directly accessible by the agent software instance. The network gateway address can be an IP address of a router usable for facilitating the communication of data between network subnets within the computer network. At 906, at least one other network subnet can be obtained by the agent software probing the at least one network gateway address. That is, the at least one network gateway address obtained at 904 can have a number of other network subnets associated with it, which other network subnets are not directly accessible by the agent software instance (e.g., without routing communications by the agent software instance through a router associated with the at least one network gateway address). As such, instructions can be sent to the agent software instance to identify at least one other network subnet using the at least one network gateway address. In some implementations, the other network subnets can be identified by accessing a management API of the at least one network gateway address using credentials (which may, for example, be input by a user of the software wizard of FIG. 5) to identify the subnets accessible via the at least one network gateway address using internal information stored within a router associated with the at least one network gateway address. In some implementations, the other network subnets can be identified by transmitting test packets to different networks to identify the other network subnets, for example, by using a traceroute utility or protocol, or a combination thereof.

At 908, a discovery profile can be generated for the agent software instance selected at 902. In some implementations, the discovery profile can include the network subnet obtained at 904 as well as the at least one other network subnet obtained at 906. In some implementations, the discovery profile can further include information about hardware or software components of the computer network corresponding to the obtained network subnets. For example, the discovery profile can include an indication of the types of components associated with the obtained network subnets (e.g., routers, switches, load balancers, virtual machines, or the like).

Referring now to FIG. 10, in some implementations, the technique 1000 includes receiving a hierarchy of geo-location identifiers corresponding to levels indicating degrees of geographical abstraction 1002, receiving a listing of network subnets having associated geo-location identifiers included in the hierarchy 1004, mapping geo-location identifiers from the list to corresponding first levels according to the hierarchy of geo-location identifiers 1006, generating a geographical map of the computer network at a first level by including indicators according to geo-location identifiers from the listing 1008, generating a graphical user interface including the geographical map and user interface elements for capturing commands 1010, receiving a command associated with a geo-location identifier 1012, determining a set of network subnets associated with the geo-location identifier and at least one agent software instance usable to discover the set 1014, and initiating discovery of the set of network subnets using the at least one agent software instance 1016.

At 1002, a hierarchy of geo-location identifiers can be received. The geo-location identifiers can correspond to levels of the hierarchy indicating degrees of geographical abstraction. For example, the hierarchy can include a list of geo-location identifiers identified at a top-level by continent and at a bottom-level by city. The geo-location identifiers can be associated with network subnets discovered within a computer network, for example, using the technique 900. As such, at 1004, a listing of the network subnets can be received. At 1006, the geo-location identifiers from the listing received at 1004 can be mapped to corresponding first levels of geographical abstraction according to the hierarchy received at 1002. For example, a first level can be a state level within a country, such that a first network subnet can be mapped to the state of California and a second network subnet can be mapped to the state of New York.

At 1008, a geographical map of the computer network at a first level can be generated based on indicators according to geo-location identifiers from the listing received at 1004. In some implementations, generating a geographical map can include selecting a template map corresponding to the geo-location identifiers to be displayed on the geographical map and populating the template using the geo-location identifiers. For example, the template can be a blank map of the United States, and the first level geo-location identifiers can be those mapped at 1006, for example, to indicate the states of California and New York on the geographical map. Indicators can thus be included in the geographical map to indicate the geo-location identifiers for the network subnets within the states of California and New York. For example, an indicator can be a flag, a circle or other shape, or other element, or combination thereof, that indicates a location of the geographical map associated with a geo-location identifier of the list of network subnets. At 1010, a graphical user interface can be generated for capturing commands in connection with the geographical map generated at 1008. In some implementations, the graphical user interface can include user interface elements, such as buttons or other elements that a user can interact with to transmit a command. In some implementations, a command can include instructions to perform an action with respect to an indicated portion of the geographical map. The user interface elements may correspond to indicators of the geographical map. For example, where a network subnet of the list received at 1004 is associated with San Diego, Calif., the geographical map can include an indicator located at San Diego, Calif. The graphical user interface can include a user interface element (e.g., an interactive button) to represent the indicator.

At 1012, a command associated with a geo-location identifier can be received. The geo-location identifier can correspond to a portion of the map selected by the user through the graphical user interface. In some implementations, the portion of the geographical map selectable by the user can be of a size defined by the user, in any event not to exceed the size of the geographical map itself. The command can indicate an action to be performed with respect to the geo-location identifier. For example, the command can be generated by the user clicking on the state of California within the graphical user interface and selecting to perform a discovery operation for network subnets located within the state of California.

At 1014, a set of network subnets associated with the geo-location identifier can be determined. Using the last example, a table can be queried for a list of network subnets located within the state of California. That same table or a different table can also be queried for information about an agent software instance associated with the list of network subnets. In some implementations, the agent software instance for which information is queried can be an agent software instance having direct access to the network subnets of the list of network subnets. In some implementations, the agent software instance for which information is queried can be identified based on a discovery profile including the network subnets of the list of network subnets (e.g., which discovery profile can be generated by the technique 900). At 1016, a discovery operation is initiated based on the command received at 1012. In some implementations, performing a discovery operation based on a command corresponding to one or move levels of geographical abstraction of a computer network can include performing discovery using an ARP cache rather than a full ping sweep of the network subnets associated with the map location indicated by the command.

Although the technique 900 and the technique 1000 are shown as a series of operations for clarity, implementations of the technique 900 or the technique 1000, or any other method, process, or algorithm described in connection with the implementations disclosed herein, can be performed in various orders or concurrently. Additionally, operations in accordance with this disclosure can be performed with other operations not presented and described herein. Furthermore, one or more aspects of the systems and techniques described herein can be omitted.

All or a portion of the implementations of the systems and techniques described herein can be implemented using a general-purpose computer/processor with a computer program that, when executed, carries out any of the respective techniques, algorithms, or instructions described herein. In addition, or alternatively, for example, a special-purpose computer/processor can be utilized which can contain specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array such as a field-programmable gate array (FPGA) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with any combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

The use of the terms "a," "an," "the," or similar referents in the context of describing the systems and techniques (especially in the context of the following claims) should be construed to cover both the singular and the plural. Furthermore, unless otherwise indicated herein, the recitation of ranges of values herein is intended merely to serve as a shorthand alternative to referring individually to respective separate values falling within the ranges, and respective separate values are incorporated into the specification as if individually recited herein. Finally, the operations of all techniques described herein are performable in any suitable order unless clearly indicated otherwise by the context. The use of any and all examples, or language suggesting that an example is being described (e.g., "such as"), provided herein is intended merely to better illuminate the systems and techniques and does not pose a limitation on the scope of the systems and techniques unless otherwise claimed.

All references, including publications, patent applications, and patents, cited herein are hereby incorporated by reference to the same extent as if respective references were individually and specifically indicated as incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system for discovering components of a computer network, the system comprising:
 a processor; and
 a memory, wherein the memory includes instructions, that when executed by the processor, cause the processor to:
  receive, from a graphical user interface of a client device, a first command to generate a discovery profile for a computing device that includes a network interface connected to the computer network;
  obtain a first network subnet and at least one network gateway address from the computing device, the first network subnet and the at least one network gateway address associated with the network interface;
  send additional instructions to the computing device to identify a second network subnet based on the at least one network gateway address;
  generate the discovery profile for the computing device, the discovery profile including the first network subnet associated with a first geo-location identifier and the second network subnet associated with a second geo-location identifier;

generate a geographical map of the computer network for display on the client device, the geographical map including a first indicator associated with the first geo-location identifier and a second indicator associated with the second geo-location identifier;

transmit, to the client device, an updated graphical user interface comprising the geographical map of the computer network;

receive, from the updated graphical user interface of the client device, a second command via the geographical map indicative of a selection of the first indicator or the second indicator to initiate discovery of one or more additional network subnets associated with the first geo-location identifier or the second geo-location identifier, respectively;

initiate discovery for the one or more additional network subnets associated with the respective first or second geo-location identifiers in response to receiving the second command via the geographical map indicative of the selection of the first indicator or the second indicator; and transmit, to the client device, an update to the geographical map of the computer network in response to discovering the one or more additional network subnets associated with the respective first or second geo-location identifiers, wherein an updated geographical map comprises a third indicator associated with a third geo-location identifier associated with the one or more discovered additional network subnets.

2. The system of claim 1, wherein the computing device is selected from a list of candidate computing devices associated with the computer network.

3. The system of claim 1, wherein the first command includes a request for an Internet Protocol (IP) address, an IP range, an IP network, a host name, a capability, or any combination thereof, and wherein the instructions cause the processor to select the computing device from a list of candidate computing devices responsive to a determination that the computing device may satisfy the request.

4. The system of claim 1, wherein the instructions cause the processor to select the computing device from a list of candidate computing devices based on respective network latencies, respective connection strengths, or both, of the candidate computing devices.

5. The system of claim 1, wherein the instructions cause the processor to schedule a discovery operation configured to initiate discovery of a network device associated with the first network subnet or the second network subnet based on the discovery profile.

6. The system of claim 1, wherein the instructions cause the processor to generate at least one configuration item (CI) within a configuration management database (CMDB), wherein the at least one CI is associated with the first network subnet, the second network subnet, a network device associated with the first network subnet or the second network subnet, or any combination thereof.

7. The system of claim 1, wherein the first geo-location identifier, the second geo-location identifier, and the third geo-location identifier correspond to respective levels of a geographical abstraction hierarchy.

8. The system of claim 7, wherein the updated geographical map comprises updating the third indicator associated with the third geo-location identifier but not the selected first indicator or the selected second indicator.

9. A method of discovering components of a computer network, the method comprising:

generating a geographical map of the computer network for display on a client device based on a discovery profile associated with a computing device of the computer network, wherein the discovery profile comprises a first network subnet associated with a first geo-location identifier and a second network subnet associated with a second geo-location identifier, and wherein the geographical map includes a first indicator associated with the first geo-location identifier and a second indicator associated with the second geo-location identifier;

transmitting, to the client device, a graphical user interface comprising the geographical map of the computer network;

receiving, from the graphical user interface of the client device, a command from via the geographical map indicative of a selection of the first indicator or the second indicator to initiate discovery of one or more additional subnets associated with the first geo-location identifier or the second geo-location identifier, respectively;

initiating discovery for one or more additional network subnets associated with the respective first or second geo-location identifiers in response to receiving the command via the geographical map indicative of the selection of the first indicator or the second indicator; and transmitting, to the client device, and update to the geographical map of the computer network in response to discovering the one or more additional network subnets associated with the respective first or second geo-location identifiers, wherein an updated geographical map comprises a third indicator associated with a third geo-location identifier associated with the one or more discovered additional network subnets.

10. The method of claim 9, wherein the command is a first command, and the method comprises:

receiving, from the graphical user interface, a second command to generate the discovery profile for the computing device;

obtaining the first network subnet and at least one network gateway address from the computing device;

sending additional instructions to the computing device to identify the second network subnet based on the at least one network gateway address; and generating the discovery profile for the computing device.

11. The method of claim 10, wherein the computing device is selected form a list of candidate computing devices associated with the computer network.

12. The method of claim 10, wherein the second command includes a request for an Internet Protocol (IP) address, an IP range, an IP network, a host name, a capability, or any combination thereof, and wherein the method comprises selecting the computing device from a list of candidate computing devices responsive to a determination that the computing device may satisfy the request.

13. The method of claim 10, comprising selecting the computing device from a list of candidate computing devices based on respective network latencies, respective connection strengths, or both, of the candidate computing devices.

14. The method of claim 9, comprising scheduling a discovery operation configured to initiate discovery of a network device associated with the first network subnet or the second network subnet based on the discovery profile.

15. The method of claim 9, comprising generating at least one configuration item (CI) within a configuration management database (CMDB), wherein the at least one CI is associated with the first network subnet, the second network subnet, a network device associated with the first network subnet or the second network subnet, or any combination thereof.

16. A system for discovering components of a computer network, the system comprising:
a processor; and
a memory, wherein the memory includes instructions, that when executed by the processor, cause the processor to:
receive, from a graphical user interface of a client device, a first selection of a computing device associated with the computer network;
iteratively identify a plurality of network subnets accessible by the selected computing device;
generate a discovery profile for the selected computing device, the discovery profile including the plurality of iteratively identified network subnets associated with respective geo-location identifiers;
generate a geographical map of the computer network for display on client device, the geographical map comprising one or more indicators associated with the respective geo-location identifiers;
transmit, to the client device, an updated graphical user interface comprising the geographical map of the computer network;
receive, from the updated graphical user interface of the client device, a second selection of an indicator of the one or more indicators associated with the respective geo-location identifiers via the geographical map, wherein the selection of the indicator is configured to initiate discovery of one or more additional network subnets associated with the respective geo-location identifiers;
initiate discovery for the one or more additional network subnets associated with the respective geo-location identifiers in response to receiving the second selection of the one or more indicators via the geographical map; and
transmit, to the client device, an update to the geographical map of the computer network in response to discovering the one or more additional network subnets associated with the respective geo-location identifiers, wherein an updated geographical map comprises an additional indicator associated with an additional geo-location identifier associated with the one or more discovered additional network subnets.

17. The system of claim 16, wherein the instructions cause the processor to:
receive a request for an Internet Protocol (IP) address, and IP range, an IP network, a host name, a capability, or any combination thereof; and
select the computing device from a list of candidate computing devices responsive to a determination that the computing device may satisfy the request.

18. The system of claim 16, wherein the instructions cause the processor to schedule a discovery operation configured to initiate discovery of a network device associated with a network subnet of the plurality of iteratively identified network subnets based on the discovery profile.

19. The system of claim 16, wherein the instructions cause the processor to select the computing device from a list of candidate computing devices based on respective network latencies, respective connection strengths, or both, of the candidate computing devices.

20. The system of claim 16, wherein the instructions cause the processor to generate at least one configuration item (CI) within a configuration management database (CMDB), wherein the at least one CI is associated with a network subnet of the plurality of iteratively identified network subnets, a network device associated with one of the plurality of iteratively identified network subnets, or any combination thereof.

* * * * *